(12) United States Patent
Kousaki

(10) Patent No.: US 8,484,606 B2
(45) Date of Patent: Jul. 9, 2013

(54) METHOD AND SYSTEM FOR VOLTAGE FLUCTUATION AMOUNT CALCULATION

(75) Inventor: Yasuo Kousaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 550 days.

(21) Appl. No.: 12/580,829

(22) Filed: Oct. 16, 2009

(65) Prior Publication Data

US 2010/0146470 A1   Jun. 10, 2010

(30) Foreign Application Priority Data

Dec. 5, 2008   (JP) ................................. 2008-310812

(51) Int. Cl.
*G06F 17/50*   (2006.01)
(52) U.S. Cl.
USPC ......................................................... 716/136
(58) Field of Classification Search
USPC ......................................... 716/120, 127, 137
See application file for complete search history.

(56) References Cited

U.S. PATENT DOCUMENTS

| | | | |
|---|---|---|---|
| 6,920,316 B2 | 7/2005 | Connell et al. | |
| 7,203,921 B2 | 4/2007 | Ishikawa et al. | |
| 2008/0066038 A1 | 3/2008 | Masumura | |

FOREIGN PATENT DOCUMENTS

| | | |
|---|---|---|
| JP | 2004-258869 A | 9/2004 |
| JP | 2005-502249 A | 1/2005 |
| JP | 2008-70924 A | 3/2008 |
| JP | 2008-141115 A | 6/2008 |

*Primary Examiner* — Vuthe Siek
*Assistant Examiner* — Aric Lin
(74) *Attorney, Agent, or Firm* — Westerman, Hattori, Daniels & Adrian, LLP

(57) ABSTRACT

Method includes specifying a first relationship between power supply voltage in a semiconductor device and the maximum operable frequency of internal circuit upon fluctuation of the power supply voltage being detected by changing the power supply voltage in the semiconductor device and the operating frequency of the internal circuit, specifying second relationship between the maximum operable frequency of the internal circuit and the mounting manner of the decoupling capacitor upon the fluctuation of the power supply voltage being detected by changing the mounting manner of the decoupling capacitor and the operating frequency of the internal circuit, and calculating the fluctuation amount of the power supply voltage corresponding to the decoupling capacitor mounting manner based on the first relationship and the second relationship.

14 Claims, 13 Drawing Sheets

METHOD AND SYSTEM FOR VOLTAGE FLUCTUATION AMOUNT CALCULATION

CROSS-REFERENCE TO RELATED APPLICATION

This application is based upon and claims the benefit of priority of the prior Japanese Patent Application No. 2008-310812, filed on Dec. 5, 2008, the entire contents of which are incorporated herein by reference.

FIELD

The embodiments discussed herein are related to a voltage fluctuation amount calculation method and system.

BACKGROUND

FPGA (Field Programmable Gate Array) is a semiconductor device that allows users to arbitrarily determine (programming) the positioning of pins, an I/O signal allocated to each pin, a circuit structure, etc.

In general, to a power supply input unit to a semiconductor device, a decoupling capacitor (or referred to as a "bypass capacitor") is mounted for the purpose of suppressing power supply noise generated from the semiconductor device or radiation electromagnetic noise (EMI) accompanied by the power supply noise. Advantages of the decoupling capacitor are confirmed generally by the use of a printed circuit board simulation.

A method for designing a mounting circuit of a decoupling capacitor when the decoupling capacitor is placed on an integrated circuit (IC) to be mounted is described in, for example, Japanese Laid-Open Patent Publication No. 2004-258869

However, in semiconductor devices, such as a high-performance FPGA, in which circuit operation is bulky, complicated, and arbitrary, it is dramatically difficult to estimate a suitable decoupling capacitor mounting manner. In a substrate on which such a semiconductor device is mounted, a guard band needs to be assumed because modeling and extraction of an operation pattern are extremely difficult. More specifically, in order to maintain design quality for preventing troubles, a decoupling capacitor is excessively mounted. Thus, a substrate manufacturing cost increases, and moreover manufacturability deteriorates.

SUMMARY

According to an aspect of the invention, a method for calculating voltage fluctuation amount of power supply voltage generated in a semiconductor device corresponding to mounting manner of a decoupling capacitor mounted on a power supply input unit to the semiconductor device includes providing an internal circuit in the semiconductor device for detecting fluctuation of the power supply voltage in the semiconductor device, the fluctuation of the power supply voltage being detected by being stuck of the internal circuit, specifying a first relationship between the power supply voltage in the semiconductor device and maximum operable frequency of the internal circuit, upon the power supply voltage being detected by changing the power supply voltage in the semiconductor device and the operating frequency of the internal circuit, specifying second relationship between the maximum operable frequency of the internal circuit and the mounting manner of the decoupling capacitor, upon the fluctuation of the power supply voltage being detected by changing the mounting manner of the decoupling capacitor and the operating frequency of the internal circuit, specifying the power supply voltage in the semiconductor device corresponding to the decoupling capacitor mounting manner based on the first relationship and the second relationship, and calculating the fluctuation amount from predetermined power supply voltage based on the specified power supply voltage.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Best modes for carrying out the embodiment will be described with reference to the attached drawings.

First Embodiment

Figure 1:
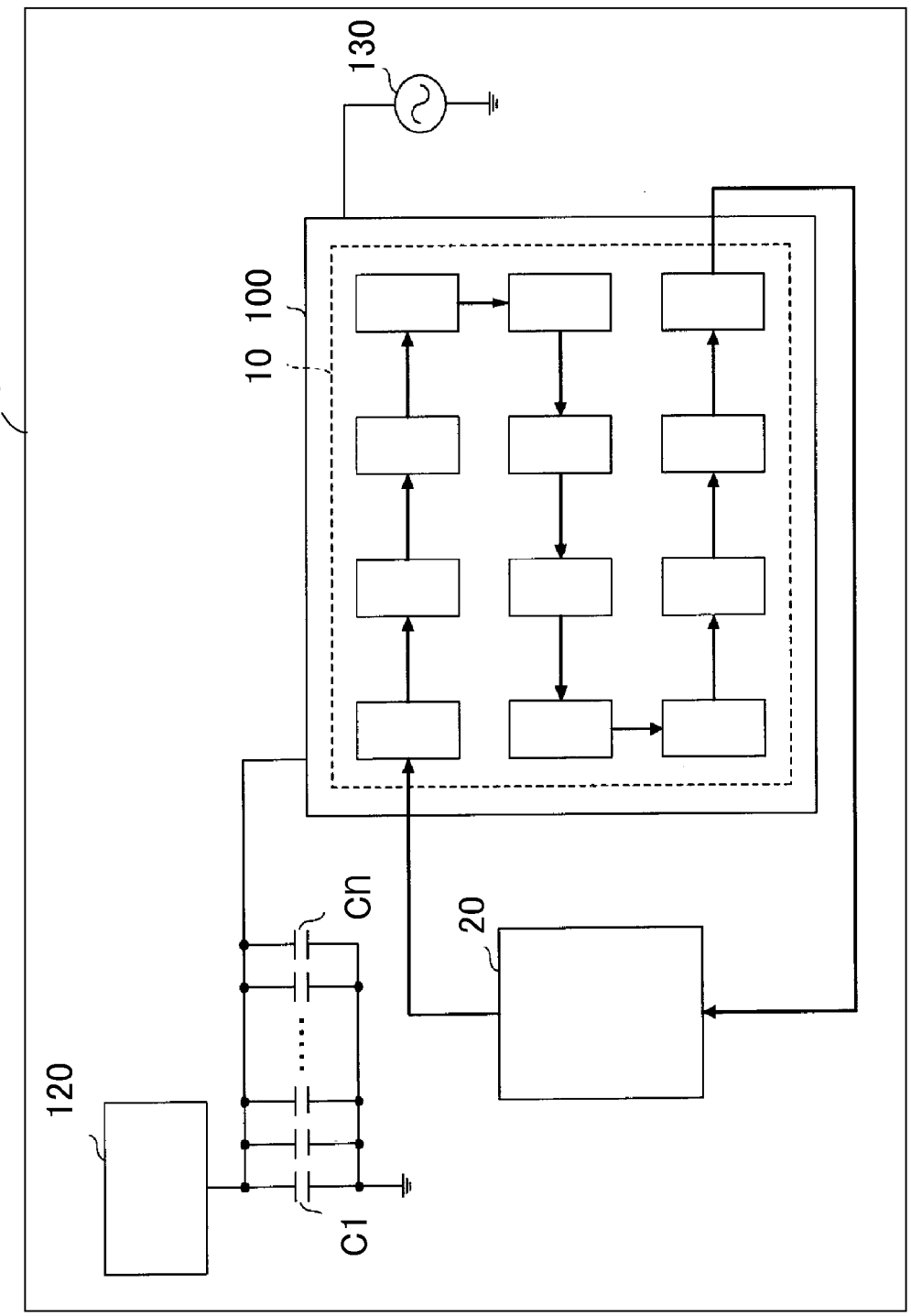
FIG. 1 illustrates a system according to first embodiment.

FIG. 1 illustrates a system 1 for voltage fluctuation amount calculation according to the first embodiment. According to the system 1, an equivalent fluctuation amount of a power supply voltage in a semiconductor device 100 corresponding to a decoupling capacitor mounting manner can be calculated. Furthermore, according to the system 1, a mounting manner of a decoupling capacitor C1 to Cn disposed at a power supply input unit 120 to the semiconductor device 100 can be determined.

The system 1 has an internal circuit 10 for detecting fluctuation of a power supply voltage generated in a semiconductor device (e.g., FPGA) 100 and a measurement controller, i.e., a controller 20, for measuring the maximum operating frequency Fmax at which the internal circuit 10 can operate.

The internal circuit 10 is constituted as a shift register circuit or a counter circuit utilizing an unused circuit and an unused wiring in the FPGA 100. The controller 20 measures the maximum operating frequency Fmax of the internal circuit 10 by detecting that any register circuit in the internal circuit 10 stopped operation and is stuck by the power supply voltage fluctuation in the FPGA 100.

Figure 2:
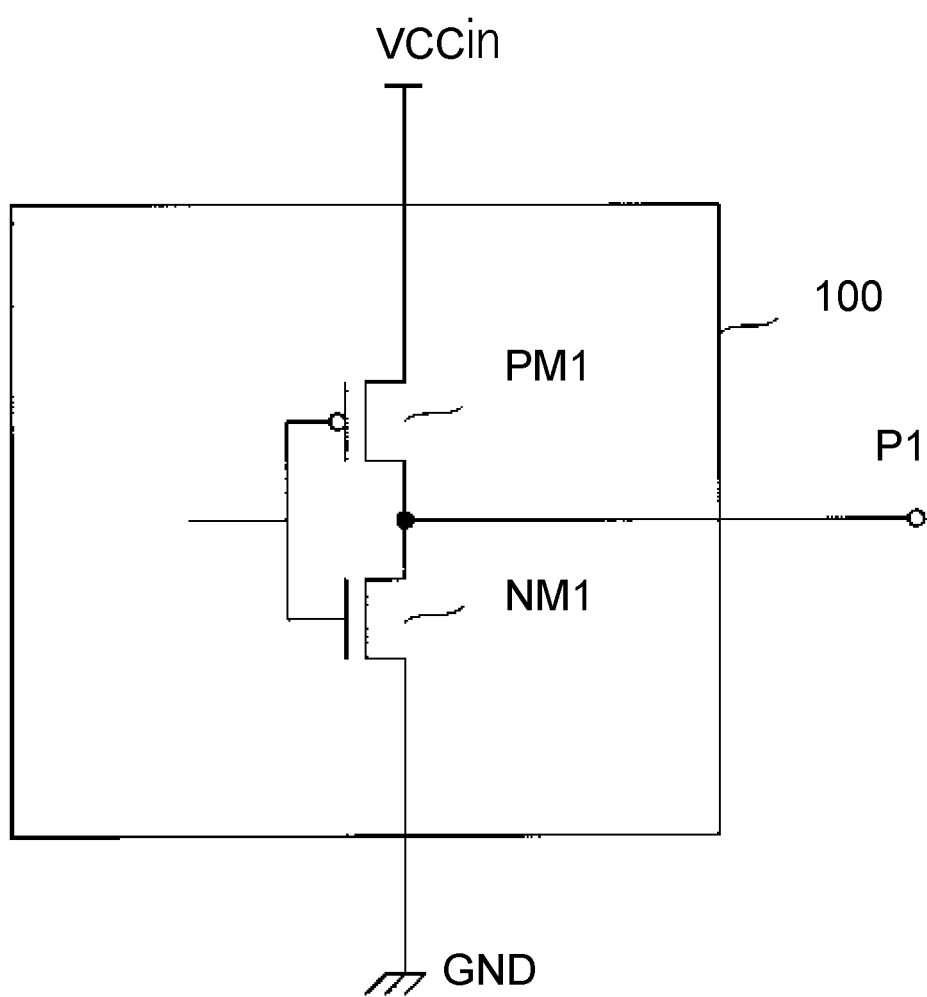
FIG. 2 is a view for illustrating fluctuation of a power supply voltage generated in a semiconductor device.

Here, the power supply voltage fluctuation in the FPGA 100 will be described. FIG. 2 illustrates the power supply voltage fluctuation generated in the FPGA 100. In FIG. 2, VCCin indicates an internal power supply voltage.

CMOS constituted by a P-channel MOSFET (hereinafter referred to as a "PMOS transistor") PM1 and an N-channel MOSFET (hereinafter referred to as an "NMOS transistor") NM1 is connected to the internal power supply voltage VCCin with a source of the PMOS transistor PM1 and is connected to ground (GND) with a source of the NMOS transistor NM1. To the gate of each of the PMOS transistor PM1 and the NMOS transistor NM1, the same signal is input. Then, an output signal of the CMOS is output from a specific pin P1 of the FPGA 100. A signal output from the pin P1 is L (low) when the input signal is H (high) and, in contrast, is H when the input signal is L. This shows that the CMOS has a function as an inverter.

When the level of the input signal changes from H to L or from L to H, a current flowing from the CMOS to the ground changes. The changes in the current change a ground voltage level. The changes in a ground voltage level occur in the direction of increasing the voltage level. Therefore, a potential difference between the ground and the internal power supply voltage becomes low, resulting in that the internal power supply voltage seemingly decreases. More specifically, changes in the ground voltage level are equivalent to fluctuation (lowering) of the internal power supply voltage.

The equivalent fluctuation of the internal power supply voltage affects circuit operation. Defects, such as logical malfunction in which the circuit does not normally operate or timing error in which each signal does not operate in a given period of time, may arise. Therefore, such equivalent fluctuation of the internal power supply voltage needs to be considered in designing the FPGA.

Referring to FIG. 1 again, a power supply input unit 120 is connected to the FPGA 100, and a plurality of decoupling capacitors C1 to Cn are mounted between the FPGA 100 and the power supply input unit 120. In an initial design, an assumed maximum number of decoupling capacitors are mounted (hereinafter such a mounting manner is referred to as "full mounting"). The number is determined based on experiences and, in some cases, defined by internal rules or the like of each manufacturer. The FPGA 100 can operate by power supplied from the power supply input unit 120. Furthermore, an oscillator 130 is connected to the FPGA 100. The oscillator 130 supplies a clock frequency required for the operation of the FPGA 100.

During the operation of the FPGA 100, the controller 20 changes a power supply voltage of the FPGA 100 and measures the maximum operating frequency Fmax of the internal circuit 10. Specifically, when the internal circuit 10 operates at a given operating frequency, the controller 20 changes the power supply voltage, and records a voltage in which any register circuit of the internal circuit 10 is stuck by fluctuation of the power supply voltage in the FPGA 100. The maximum operating frequency Fmax at the recorded voltage is equivalent to the current operating frequency of the internal circuit 10. Next, the controller 20 changes a current operating frequency of the internal circuit 10, and similarly records a voltage with respect to the changed frequency. By repeating the process, the relationship illustrated in FIG. 3 can be specified.

Figure 3:
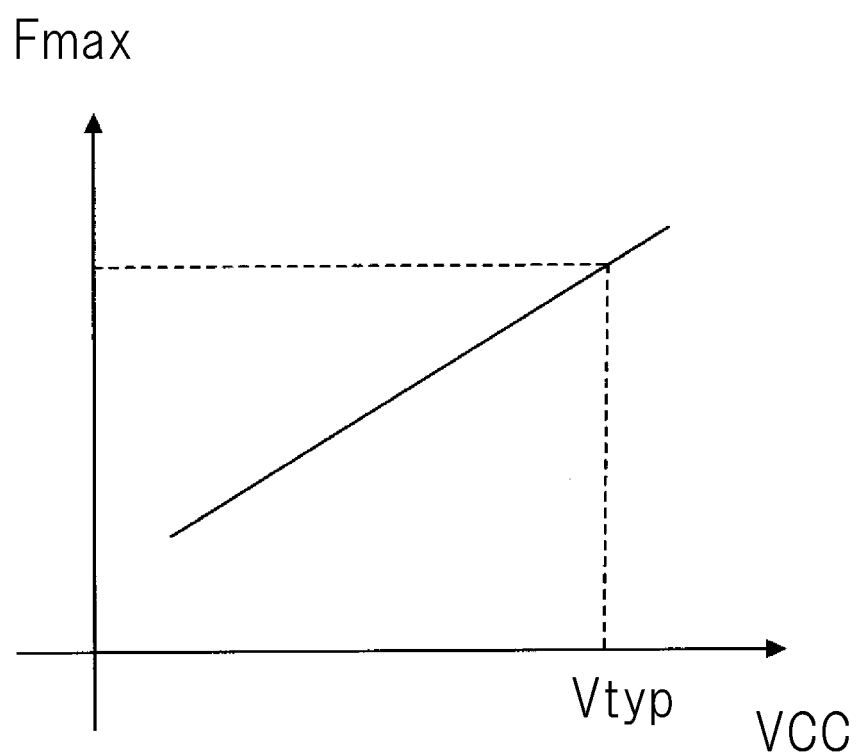
FIG. 3 is a graph illustrating a power supply voltage dependency of the maximum operating frequency of an internal circuit.

FIG. 3 is a graph illustrating a power supply voltage dependency of the maximum operating frequency of the internal circuit 10. In the graph of FIG. 3, the maximum operating frequency Fmax is plotted on the axis of ordinate and the power supply voltage VCC is plotted on the axis of abscissa. For example, in the graph of FIG. 3, the maximum operating frequency Fmax becomes large in proportion to the power supply voltage VCC. Here, the maximum operating frequency Fmax when the power supply voltage VCC is equal to a normal operation voltage Vtyp of the FPGA 100 is defined as k.

Subsequently, the power supply voltage VCC is made constant at, for example, the normal operation voltage Vtyp, and, during the operation of the FPGA 100, the controller 20 changes the decoupling capacitor mounting manner from full mounting, and measures the maximum operating frequency Fmax of the internal circuit 10. Specifically, when the internal circuit 10 operates at a given operating frequency, the controller 20 changes the decoupling capacitor mounting manner, and records the mounting manner in which any register circuit of the internal circuit 10 is stuck by the power supply voltage fluctuation in the FPGA 100. The maximum operating frequency Fmax in the recorded mounting manner is equivalent to the current operating frequency of the internal circuit 10. Next, the controller 20 changes the operating frequency of the internal circuit 10, and similarly records the mounting manner with respect to the changed frequency. By repeating the process, the relationship illustrated in FIG. 4 can be specified.

Figure 4:
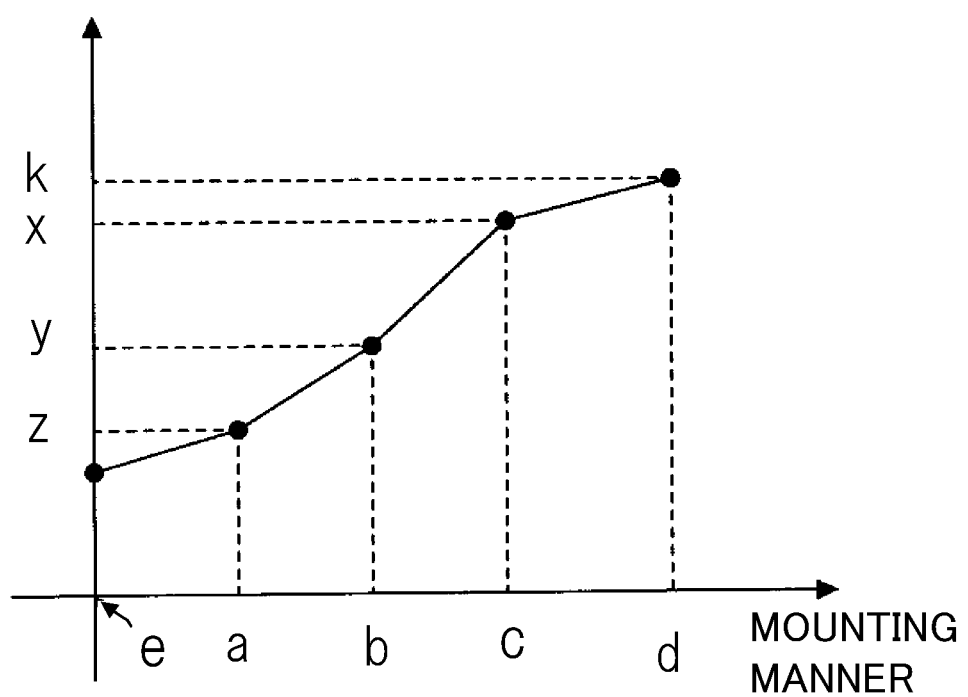
FIG. 4 is a graph illustrating changes in maximum operating frequency of an internal circuit to a decoupling capacitor mounting manner.

FIG. 4 is a graph illustrating changes in the maximum operating frequency of the internal circuit 10 to the decoupling capacitor mounting manner. In the graph of FIG. 4, the maximum operating frequency Fmax is plotted on the axis of ordinate and the decoupling capacitor mounting manner is plotted on the axis of abscissa. The decoupling capacitor mounting manner changes by changes in the number, capacity, and/or position of the capacitors to be mounted. Here, the maximum operating frequency Fmax in full mounting d is defined as k. The maximum operating frequency Fmax in each of mounting manners a, b, and c is defined as z, y, and x (k>x>y>z), respectively. And e indicates that decoupling capacitors are not mounted.

As a result, the controller 20 can obtain the relationship between the maximum operating frequency Fmax and the power supply voltage VCC illustrated in FIG. 3 and the relationship between the maximum operating frequency Fmax and the decoupling capacitor mounting manner illustrated in FIG. 4. The controller 20 can calculate an equivalent fluctuation amount of the internal power supply voltage to the decoupling capacitor mounting manner based on the relationships. The calculation method will be described below with reference to FIG. 5.

Figure 5:
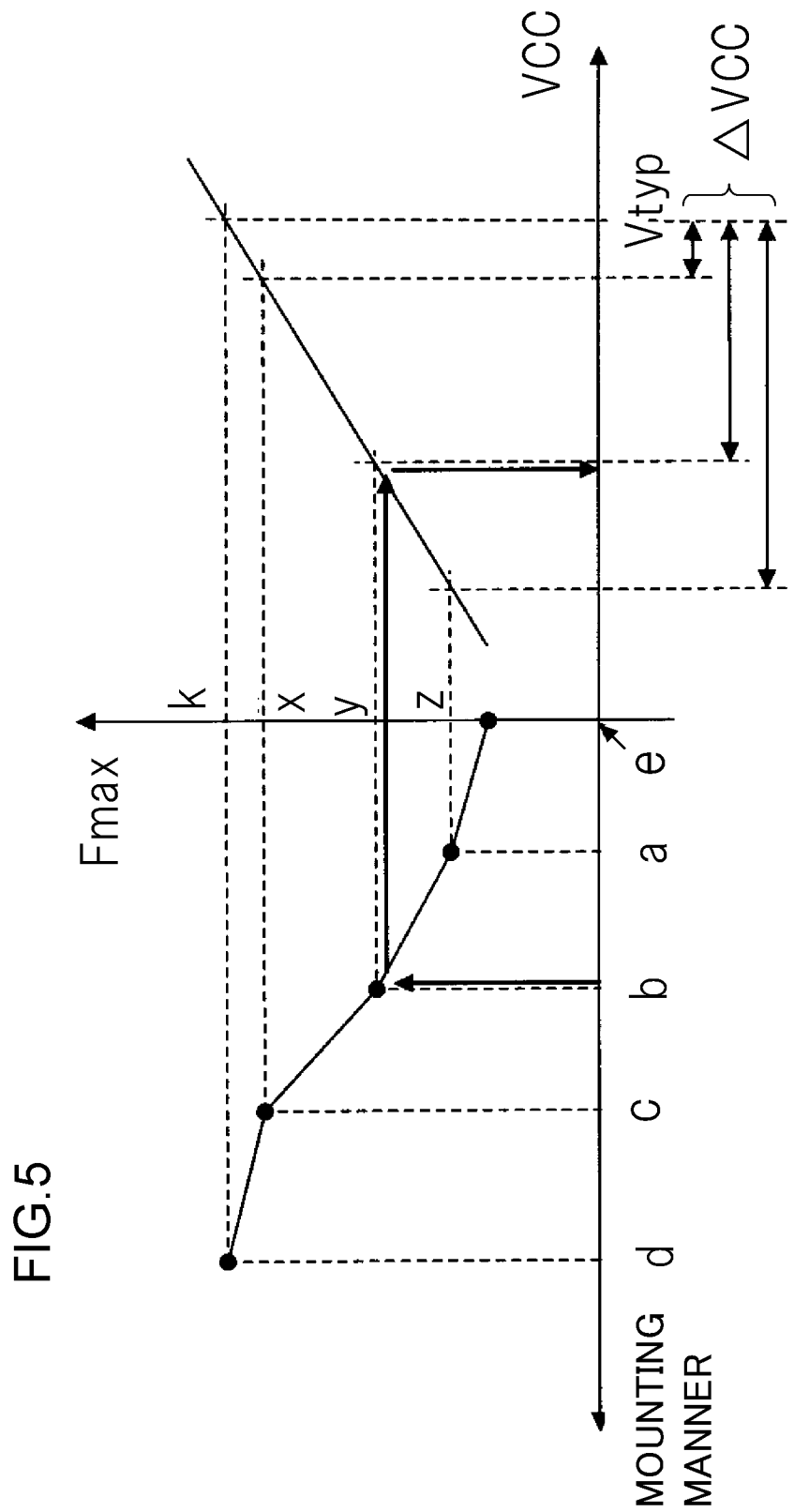
FIG. 5 is an explanatory view for illustrating a method for calculating fluctuation of a power supply voltage to a decoupling capacitor mounting manner.

FIG. 5 is an explanatory view illustrating the calculation method of the power supply voltage fluctuation to the decoupling capacitor mounting manner. In FIG. 5, a graph illustrating the power supply voltage dependency of the maximum operating frequency of the internal circuit 10 as illustrated in FIG. 3 is shown on the right side of the axis of ordinate on which the maximum operating frequency Fmax is plotted. In contrast, a graph illustrating changes in the maximum operating frequency of the internal circuit 10 to the decoupling capacitor mounting manner as illustrated in FIG. 4 is shown on the left side of the axis of ordinate. In the graph shown on the left side of the axis of ordinate, the decoupling capacitor mounting manner is plotted on the axis of abscissa, but the direction of the arrow is opposite to that in FIG. 4.

First, the controller 20 specifies the maximum operating frequency Fmax corresponding to the decoupling capacitor mounting manner with reference to the graph shown on the left side of the axis of ordinate of FIG. 5. Next, the controller 20 specifies the power supply voltage VCC corresponding to the specified maximum operating frequency Fmax with reference to the graph shown on the right side of the axis of ordinate of FIG. 5. Then, a difference ΔVCC obtained by subtracting the specified power supply voltage VCC from the normal operation voltage Vtyp is calculated. The controller 20 judges whether or not the equivalent fluctuation amount ΔVCC is within a tolerance level. The tolerance level refers to a decrease amount of the internal power supply voltage that is considered to be a voltage at which the FPGA 100 is highly likely to normally operate, for example. Therefore, the judgment whether or not the fluctuation amount ΔVCC is within the tolerance level is equivalent to judgment whether or not the FPGA 100 normally operates. Thus, the decoupling capacitor mounting manner is determined so that the fluctuation amount ΔVCC is within the tolerance level.

Figure 6:
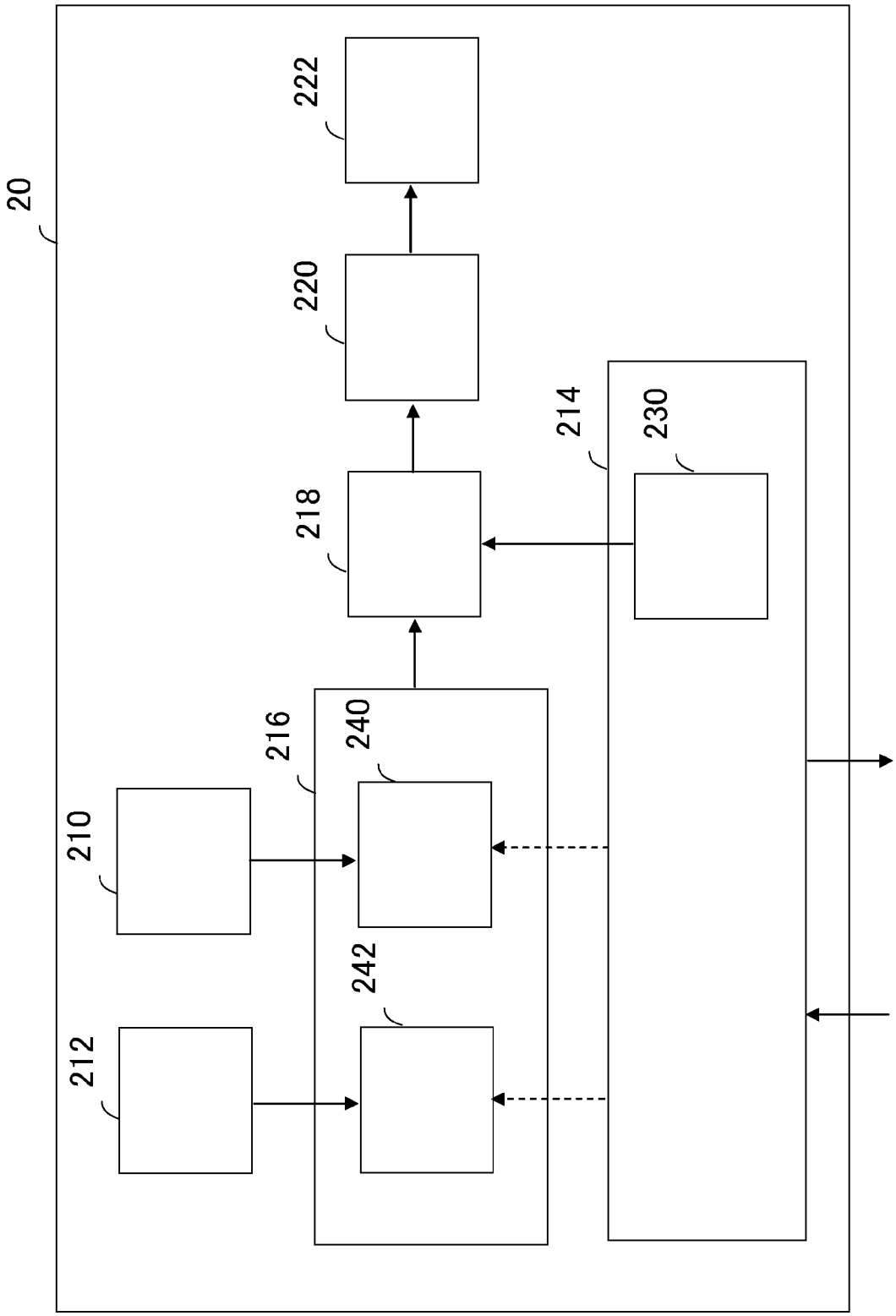
FIG. 6 is a functional block diagram of a measurement controller according to first embodiment.

FIG. 6 is a functional block diagram of the measurement controller, i.e., the controller 20, according to one embodiment. The controller 20 has a power supply voltage changing unit 210, a decoupling capacitor mounting manner changing part 212, an internal circuit driving unit 214, a measurement result obtaining unit 216, a measurement result storage unit 218, a voltage fluctuation amount calculation unit 220, and a judgment unit 222.

The power supply voltage changing part 210 can change the power supply voltage VCC of the FPGA 100. Specifically, the power supply voltage changing unit 210 changes the power supply voltage when the internal circuit 10 operates at a given operating frequency. The decoupling capacitor mounting manner changing unit 212 can change the mounting manner of a decoupling capacitor mounted between the power supply input unit 120 and the FPGA 100. Specifically, the mounting manner changing unit 212 changes the decoupling capacitor mounting manner by changing the number, capacity, and/or position of the capacitors when the internal circuit 10 operates at a given operating frequency.

The internal circuit driving unit 214 can drive the internal circuit 10 constituted utilizing an unused circuit and an unused wiring in the FPGA 100. Furthermore, the internal circuit driving unit 214 can judge whether or not any register circuit of the internal circuit 10 is stuck through the observation of the output of the internal circuit 10. In the measurement of the maximum operating frequency Fmax, when any register circuit of the internal circuit 10 is stuck by the power supply voltage fluctuation in the FPGA 100, the internal circuit driving unit 214 transmits a signal notifying the fact to the measurement result obtaining unit 216.

The internal circuit driving unit 214 has a clock signal supply unit 230, and supplies a clock signal having a frequency higher than a clock frequency supplied by the oscillator 130 to the internal circuit 10, so that the FPGA 100 operates. Before each measurement of the maximum operating frequency Fmax, the driving unit 214 scans a phase of the clock signal to be supplied to the internal circuit 10, and determines the phase in which any register circuit of the internal circuit 10 is stuck by the power supply voltage fluctuation in the FPGA 100. It is known that turbulence arises in the power supply voltage on the rising edge or the falling edge of the operation clock of the FPGA 100. The phase scanning of the clock signal of the internal circuit 10 is performed so as to securely capture such a worst operating state of the FPGA 100. The following measurement of the maximum operating frequency Fmax is performed at a phase predetermined as described above.

The measurement result obtaining unit 216 has a voltage recording unit 240 and a mounting manner recording unit 242, and can record the power supply voltage and the decoupling capacitor mounting manner when any register circuit of the internal circuit 10 is stuck, in response to a signal from the driving unit 214. The power supply voltage and the decoupling capacitor mounting manner recorded by the measurement result obtaining unit 216 is stored in the measurement result storage unit 218 while being related to the operating frequency of the internal circuit 10 at that time. Thus, the relationship between the maximum operating frequency Fmax and the power supply voltage VCC as illustrated in FIG. 3 and the relationship between the maximum operating frequency Fmax and the decoupling capacitor mounting manner as illustrated in FIG. 4 are stored in the storage unit 218.

The voltage fluctuation amount calculation unit 220 can calculate an equivalent fluctuation amount ΔVCC of the internal power supply voltage to the decoupling capacitor mounting manner by a calculation method illustrated in FIG. 5 based on the information stored in the measurement result storage unit 218.

The judgment unit 222 can determine the decoupling capacitor mounting manner, in which the FPGA 100 normally operates, from the calculating results of the voltage fluctuation amount calculation unit 220. Furthermore, the judgment unit 222 is connected to an output unit (not illustrated), and can notify the results to users through an outputting unit.

Figure 7:
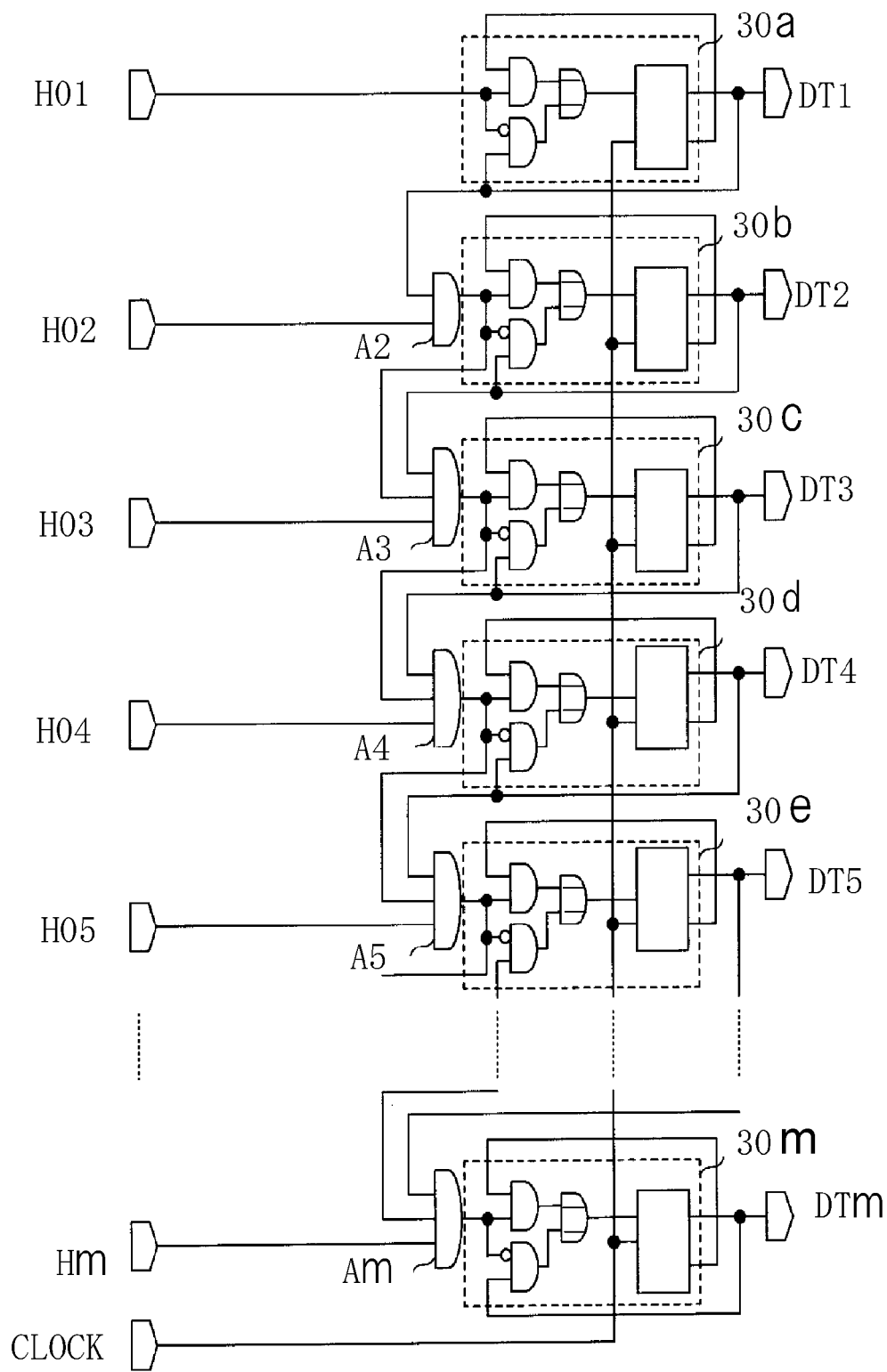
FIG. 7 illustrates a circuit structure of an internal circuit according to first embodiment.

FIG. 7 illustrates an example of the circuit structure of the internal circuit 10 according to the first embodiment. The internal circuit 10 of FIG. 7 is constituted as a counter circuit, and has a plurality of register circuits 30a to 30m. To the input of each of other register circuits except the register circuit 30a at the top, each of AND circuits A2 to Am is disposed. To each AND circuit, the output of the register circuit of a preceding stage and each of control inputs H01, H02, ..., Hm are input. To other AND circuits except the AND circuit A2 of the register circuit 30b at the second stage from the top, the output of the AND circuit of a preceding stage is further input. Such a structure of the internal circuit is common and the operation is not described in detail here.

When the power supply voltage fluctuates in the FPGA 100 during operation, a register circuit 30i mounted on an area whose potential is made the lowest by the fluctuation is stuck. The output of the internal circuit 10 is connected to the controller 20, and the controller 20 can detect that any register circuit 30i of the internal circuit 10 is stuck by the power supply voltage fluctuation in the FPGA 100 through the observation of the output of the internal circuit 10.

Figure 8:
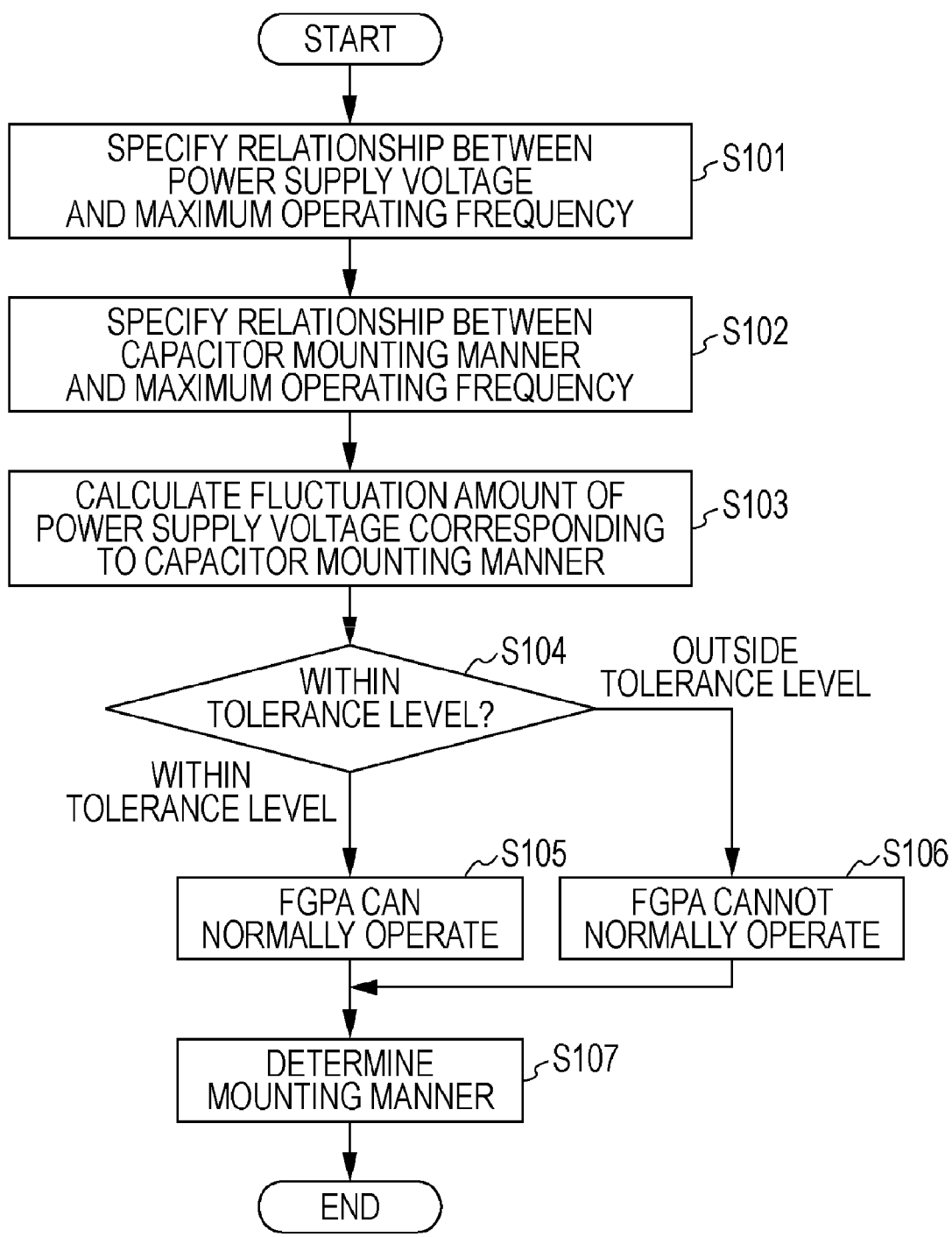
FIG. 8 is a flow chart illustrating a method according to first embodiment.

An operation of the system according to the first embodiment described above is illustrated in FIG. 8. FIG. 8 is a flow chart illustrating a method according to the first embodiment. According to the method, an equivalent fluctuation amount of the power supply voltage in the semiconductor device 100 corresponding to the decoupling capacitor mounting manner can be calculated. Furthermore, according to the method, the mounting manner of a decoupling capacitor to be disposed at the power supply input unit 120 to the semiconductor device 100 can be determined.

First, the relationship between the maximum operating frequency Fmax of the internal circuit 10 and the power supply voltage VCC as illustrated in FIG. 3 is specified in Step S101. Subsequently, the relationship between the maximum operating frequency Fmax of the internal circuit 10 and the decoupling capacitor mounting manner as illustrated in FIG. 4 is specified in Step S102. Based on the specified relationships, an equivalent fluctuation amount ΔVCC of the internal power supply voltage to the decoupling capacitor mounting manner is calculated in Step S103 using the calculation method illustrated in FIG. 5. In Step S104, it is judged whether or not the calculated equivalent fluctuation amount ΔVCC is within a tolerance level. When the amount ΔVCC is within a tolerance level, Step S105 judges that the FPGA 100 normally operates. In contrast, when the amount ΔVCC is not within a tolerance level, Step S106 judges that the FPGA 100 does not normally operate. Thus, in Step S107, that the decoupling capacitor mounting manner is determined so that the fluctuation amount ΔVCC is within a tolerance level.

Furthermore, each of the first specific step of Step S101 and the second specific step of Step S102 will be described in detail with reference to FIGS. 9 and 10.

Figure 9:
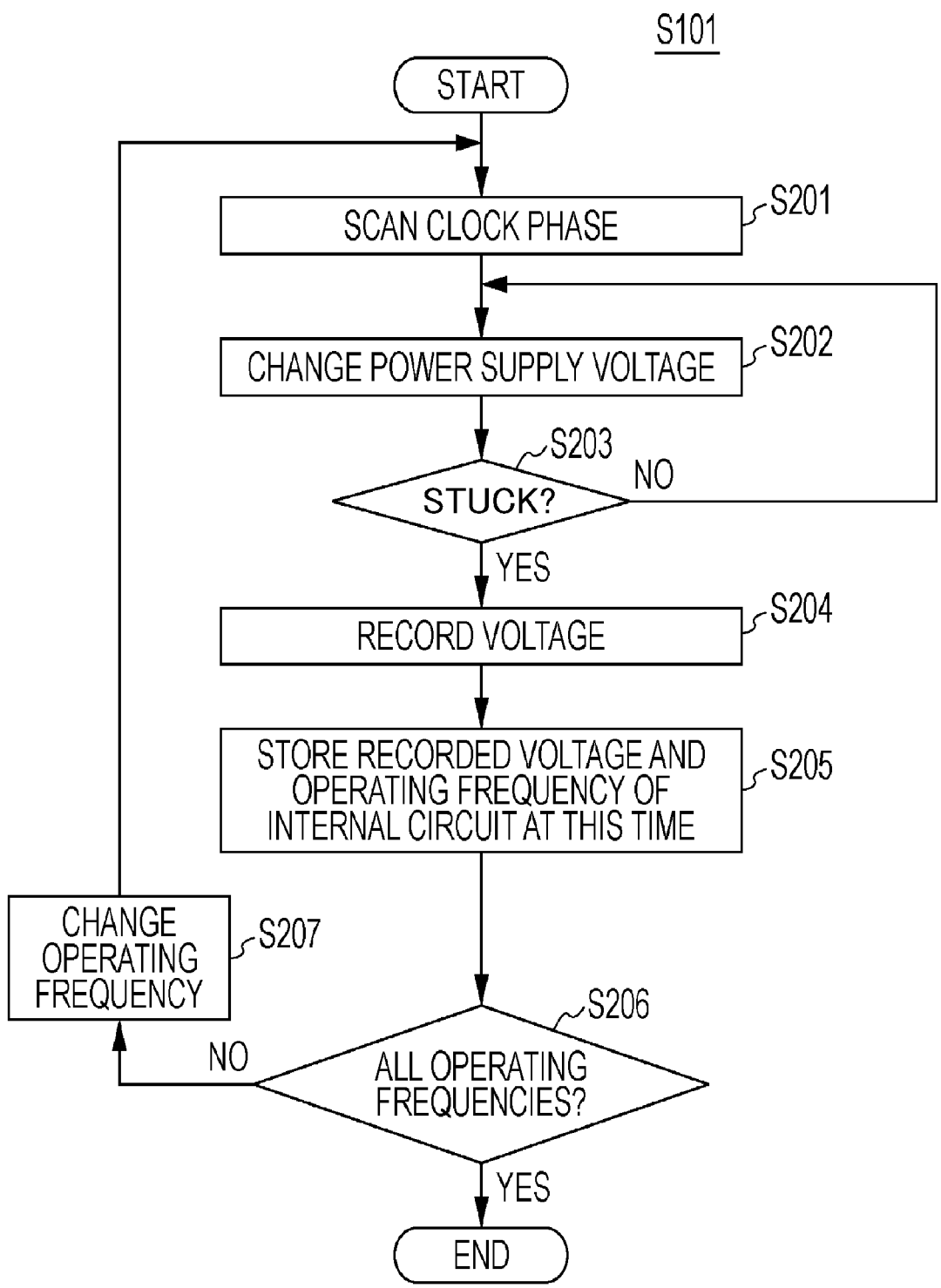
FIG. 9 is a detailed flow chart of a first specific step (S101) of FIG. 8.

FIG. 9 is a detailed flow chart of the first specific step of Step S101.

First, the phase of a clock signal of the internal circuit 10, which is a given frequency, is scanned in Step S201. Thus, a phase where the operating state of the FPGA 100 is the worst is determined. The phase of the clock signal is fixed to the determined phase.

In Step S202, a power supply voltage supplied to the FPGA 100 during operation at a given operating frequency is changed. The voltage change is successively performed until it is confirmed in Step S203 that the register circuit of the internal circuit 10 is stuck. When it is confirmed the register circuit is stuck, the power supply voltage at that time is record in Step S204. Subsequently, the recorded power supply voltage is stored while being related to the operating frequency of the internal circuit 10 at this time in Step S205.

Thereafter, it is judged in Step S206 whether or not the power supply voltage is recorded for all the operating frequencies of the internal circuit 10 where a series of processing steps need to be performed. When the power supply voltage is not yet recorded for all the operating frequencies, the operating frequency of the internal circuit 10 is changed to another given frequency in Step S207. Then, a series of processing steps are performed from Step S201 for the changed operating frequency. In contrast, when the power supply voltage is recorded for all the operating frequencies, the first specific step is terminated. Finally, the relationship between the maximum operating frequency Fmax of the internal circuit 10 and the power supply voltage VCC as illustrated in FIG. 3 is specified.

Figure 10:
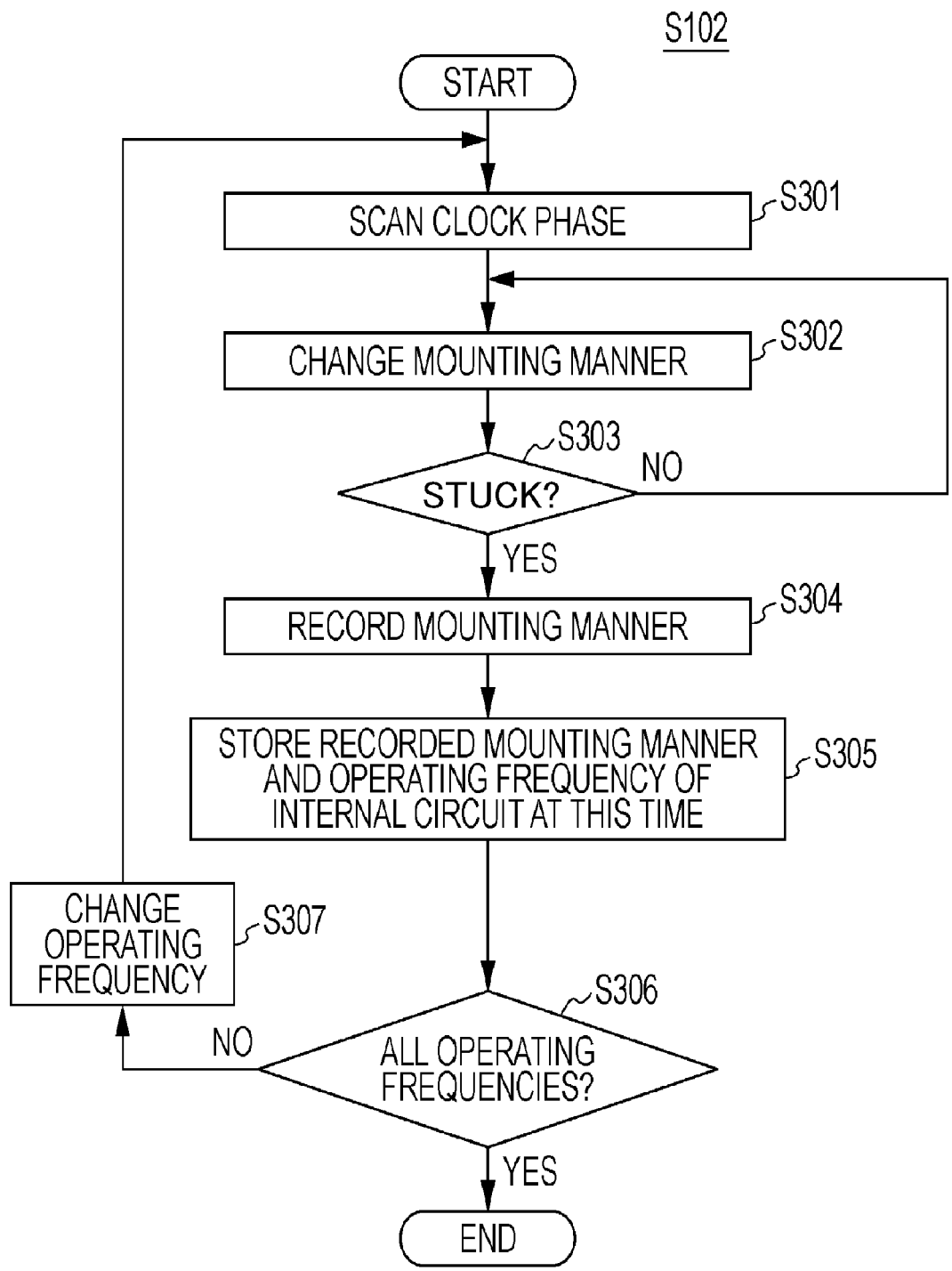
FIG. 10 is a detailed flow chart of a second specific step (S102) of FIG. 8.

FIG. 10 is a detailed flow chart of the second specific step of Step S102.

First, the phase of a clock signal of the internal circuit 10, which is a given frequency, is scanned in Step S301. Thus, a phase where the operating state of the FPGA 100 is the worst is determined. The phase of the clock signal is fixed to the determined phase.

In Step S302, the mounting manner of a decoupling capacitor mounted between the FPGA 100 and the power supply input unit 120 is changed during the operation of the FPGA 100 at a given operating frequency. The change in the mounting manner is successively performed until it is confirmed in Step S303 that the register circuit of the internal circuit 10 is stuck. When it is confirmed that the register circuit is stuck, the decoupling capacitor mounting manner at that time is recorded in Step S304. Subsequently, in Step S305, the recorded mounting manner is stored while being related to the operating frequency of the internal circuit 10 at this time.

Thereafter, it is judged in Step S306 whether or not the mounting manner is recorded for all the operating frequencies of the internal circuit 10 where a series of processing steps need to be performed. When the mounting manner is not yet recorded for all the operating frequencies, the operating frequency of the internal circuit 10 is changed to another given frequency in Step S307. Then, a series of processing steps are performed from Step S301 for the changed operating frequency. In contrast, when the mounting manner is recorded for all the operating frequencies, the second specific step is terminated. Finally, the relationship between the maximum operating frequency Fmax of the internal circuit 10 and the decoupling capacitor mounting manner as illustrated in FIG. 4 is specified.

Figure 11:
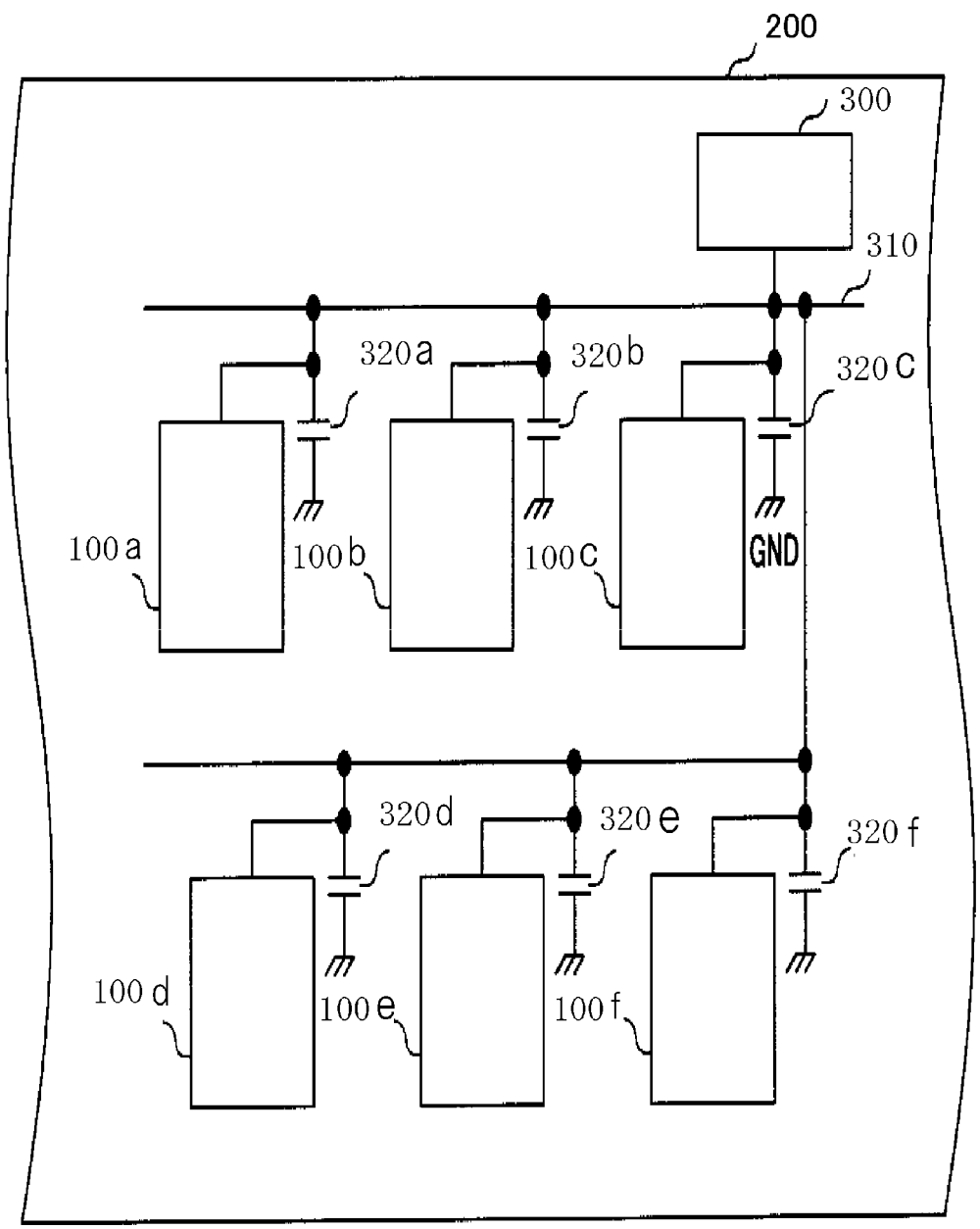
FIG. 11 illustrates a substrate mount condition of a semiconductor device according to first embodiment.

In actual, the FPGA 100 is mounted on a printed circuit board (PCB) 200 for use as illustrated in FIG. 11. In FIG. 11, a plurality of FPGAs 100a to 100f are mounted on a PCB 200. On the PCB 200, a power supply circuit 300 for generating the power supply voltage VCC of the FPGAs 100a to 100f is further disposed. The power supply voltage generated in the power supply circuit 300 is supplied to each of the FPGAs 100a to 100f via a power supply plane 310. Furthermore, decoupling capacitors 320a to 320f are inserted between the power supply plane 310 and a ground plane GND near each of the FPGAs 100a to 100f. In FIG. 11, as the decoupling capacitors 320a to 320f, one decoupling capacitor is simply illustrated, but actually a plurality of capacitors are connected in parallel as illustrated in FIG. 1.

The equivalent voltage fluctuation amount ΔVCC generated in each FPGA 100 increases as the distance on the power plane 310 from the power supply circuit 300 to the FGPA 100 is long. Therefore, in the example illustrated in FIG. 11, the equivalent voltage fluctuation amount ΔVCC generated in the FPGA 100d located at the farthest part from the power supply circuit 300 on the PCB 200 among the FPGAs 100a to 100f mounted on the PCB 200 becomes the largest. More specifically, even when the FPGA 100d is the same as the FPGA 100c located at the nearest part to the power supply circuit 300, a suitable mounting manner of each decoupling capacitor is different from each other. Considering the above, it is preferable that the equivalent fluctuation amount ΔVCC of the power supply voltage generated in each of the FPGAs 100a to 100f be calculated considering the position on the PCB 200. Therefore, the equivalent voltage fluctuation amount of all the FPGAs 100a to 100f mounted on the PCB 200 is calculated using the calculation method illustrated in FIG. 5. The use of the calculated results as indices allows evaluation of the power supply system of the PCB 200.

The system and method according to the first embodiment can be achieved by hardware or software, such as PCB simulation or by combination of hardware and software. For example, the second specific Step S102 of specifying the relationship between the maximum operating frequency Fmax of the internal circuit 10 and the decoupling capacitor mounting manner as illustrated in FIG. 4 is taken as an example. In the step, advantages of a decoupling capacitor after the mounting manner is changed are roughly estimated in a PCB simulation beforehand, and then the advantages may be confirmed by changing the mounting manner in an actual circuit.

As described above, for a semiconductor device whose circuit operation is bulky, complicated, and arbitrary, such as a high-performance FPGA, the equivalent fluctuation amount of the power supply voltage in the semiconductor device corresponding to a decoupling capacitor mounting manner can be calculated according to the first embodiment. More specifically, advantages of a decoupling capacitor can be quantitatively verified. Furthermore, according to the first embodiment, a suitable decoupling capacitor mounting manner can be determined. These are indistinct circuit operation of a semiconductor device is visualized by the maximum operating frequency Fmax. Therefore, the design quality of a semiconductor device and a printed circuit board on which the semiconductor device is mounted can be increased at a suitable cost.

Second Embodiment

The properties of the FPGA 100 can be evaluated by the application of the previously-described method for measuring the maximum operating frequency Fmax in the system and method (i.e., the first specific Step S101 or the second specific Step S102.). Hereinafter, the evaluation will be described.

The measurement controller, i.e., controller 20, according to this second embodiment further has a clock frequency changing unit (not illustrated) for changing a clock frequency required for the operation of the FPGA 100 supplied from the oscillator 130 (hereinafter referred to as an "operating frequency of the FPGA 100"). Thus, the operating frequency of the FPGA 100, which is constant at a given frequency in the first specific Step S101 or the second specific Step S102, can be changed in this second embodiment. In contrast, when the properties of the FPGA 100 are evaluated, the power supply voltage VCC of the FPGA 100 is not changed, and is constant at, for example, Vtyp. Similarly, the decoupling capacitor mounting manner is not changed, and is, for example, "full mounting." A user circuit, which is arbitrarily designed so as to achieve a given function in the FPGA 100, is generally constituted by a shift register in this Example.

Figure 12:
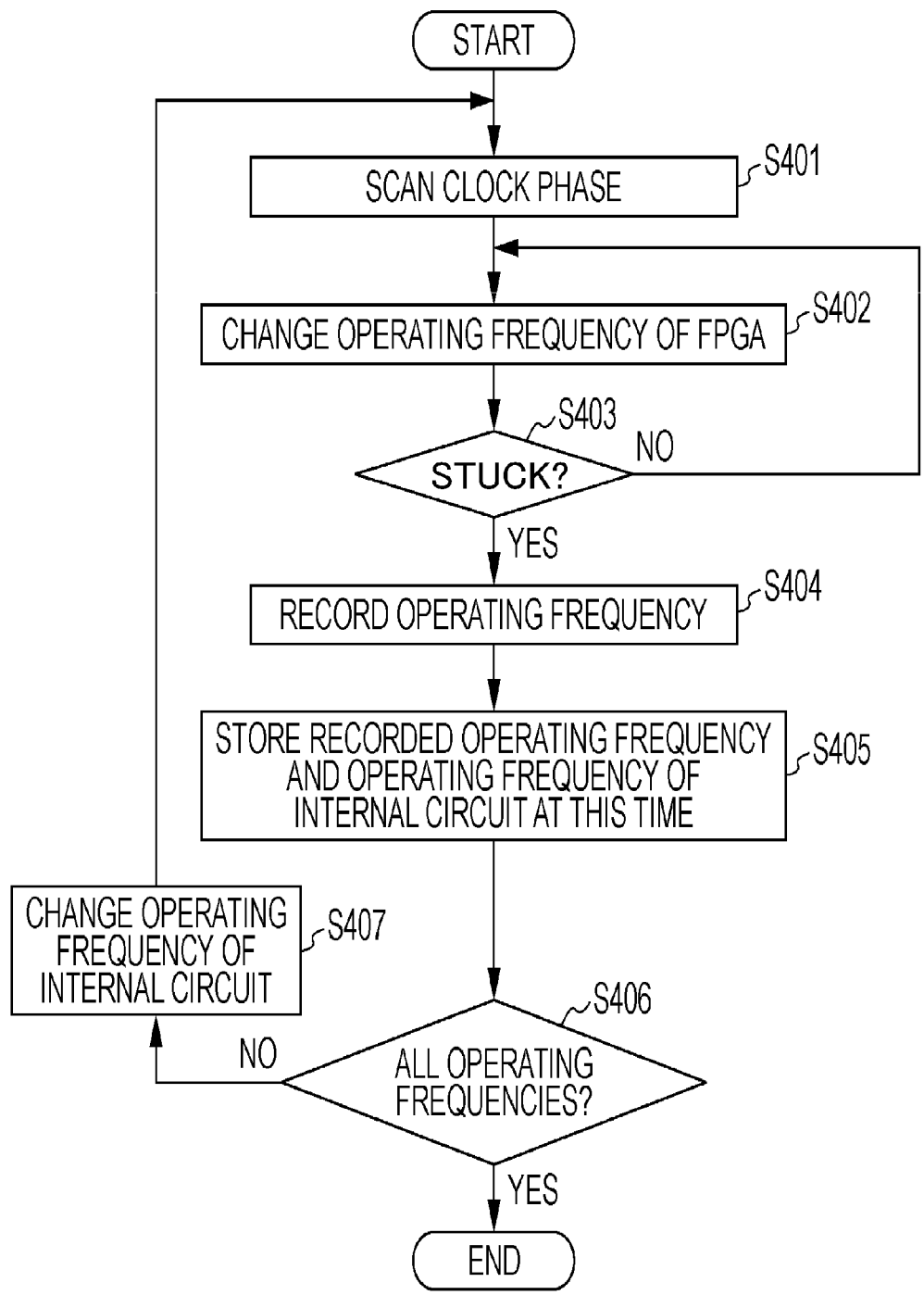
FIG. 12 is a flow chart of a method for evaluating properties of a semiconductor device according to second embodiment.

In such a case, a method for evaluating the properties of the FPGA 100 will be described with reference to FIG. 12. FIG. 12 is a flow chart of the method for evaluating the properties of the FPGA 100.

First, the phase of a clock signal of the internal circuit 10, which is given frequency, is scanned in Step S401. Thus, a phase where the operating state of the FPGA 100 is the worst is determined. The phase of the clock signal is fixed to the determined phase.

In Step S402, the frequency of a clock signal supplied to the FPGA 100 from the oscillator 130 is changed. The frequency change is successively performed until it is confirmed in Step S403 that the register circuit of the internal circuit 10 is stuck. When it is confirmed that the register circuit is stuck, the frequency of the clock signal at that time is recorded in Step S404. Subsequently, the recorded frequency of the clock signal is stored while being related to the operating frequency of the internal circuit 10 at this time in Step S405.

Thereafter, it is judged in Step S406 whether or not the frequency of the clock signal is recorded for all the operating frequencies of the internal circuit 10 where a series of processing steps need to be performed. When the frequency of the clock signal is not yet recorded for all the operating frequencies, the operating frequency of the internal circuit 10 is changed to another given frequency in Step S407. Then, a series of processing steps are performed from Step S401 for the changed operating frequency. In contrast, when the frequency of the clock signal is recorded for all the operating frequencies, a process flow for the property evaluation method is terminated. Finally, the relationship as illustrated in FIG. 13 can be specified.

Figure 13:
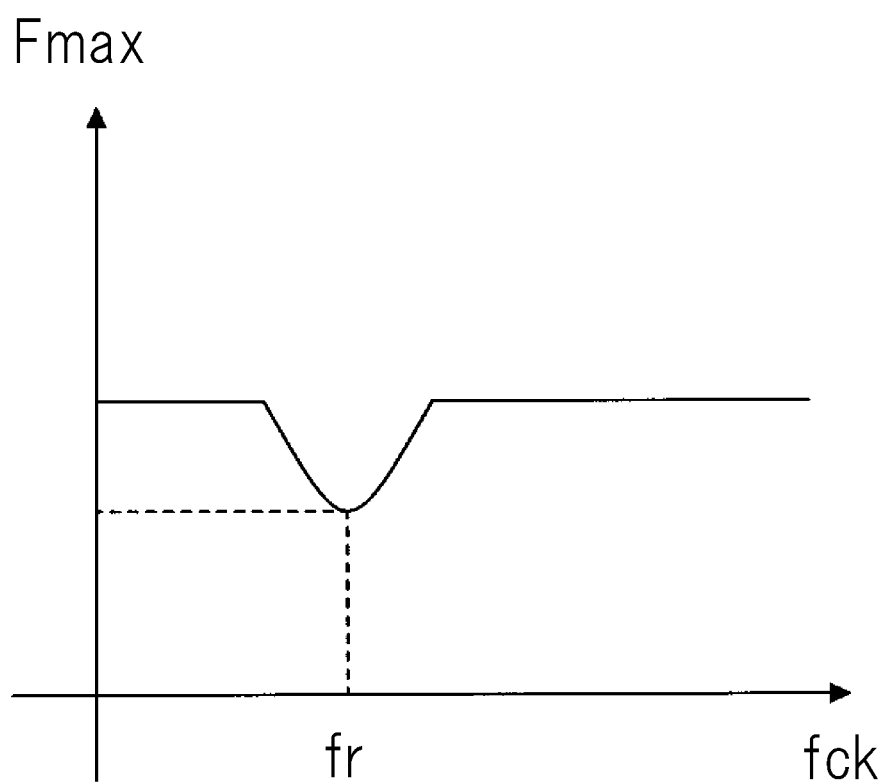
FIG. 13 is a graph illustrating changes in maximum operating frequency of an internal circuit to operating frequency of a semiconductor device.

FIG. 13 is a graph illustrating changes in the maximum operating frequency of the internal circuit 10 to the operating frequency of the FPGA 100. In the graph of FIG. 13, the maximum operating frequency Fmax of the internal circuit 10 is plotted on the axis of ordinate and the operating frequency fck of the FPGA 100 is plotted on the axis of abscissa. For example, in the graph of FIG. 13, the maximum operating frequency Fmax of the internal circuit 10 takes the minimum value when the operating frequency of the FPGA 100 takes a certain value fr. The frequency fr where the maximum operating frequency Fmax of the internal circuit 10 takes the minimum value is a resonant frequency of the FPGA 100. Thus, impedance characteristics of the power supply system in the FPGA 100 can be obtained.

The voltage fluctuation amount calculation method and system of this disclosure demonstrate advantages of making it possible to quantitatively verify advantages of a decoupling capacitor. Moreover, the decoupling capacitor mounting manner determination method and system of this disclosure demonstrate advantages of making it possible to determine a suitable decoupling capacitor mounting manner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. Method for calculating voltage fluctuation amount of power supply voltage generated in a semiconductor device corresponding to mounting manner of a decoupling capacitor mounted on a power supply input unit to the semiconductor device, the method comprising:
   (a) providing an internal circuit in the semiconductor device for detecting fluctuation of the power supply voltage generated in the semiconductor device, the fluctuation of the power supply voltage is detected to indicate a condition under which the internal circuit has stopped operation to indicate that said internal circuit is stuck by the fluctuation of the power supply voltage generated in the semiconductor device;
   (b) specifying a first relationship between the power supply voltage of the semiconductor device and maximum operable frequency of the internal circuit, upon the fluctuation of the power supply voltage being detected by changing the power supply voltage of the semiconductor device and the operating frequency of the internal circuit;
   (c) specifying a second relationship between the maximum operable frequency of the internal circuit and the mounting manner of the decoupling capacitor, upon the fluctuation of the power supply voltage being detected by changing the mounting manner of the decoupling capacitor and the operating frequency of the internal circuit;
   (d) specifying, by a controller coupled to the internal circuit in the semiconductor device, the power supply voltage of the semiconductor device corresponding to the mounting manner of the decoupling capacitor based on the first relationship and the second relationship; and
   (e) calculating the fluctuation amount of the power supply voltage from predetermined power supply voltage based on the specified power supply voltage.

2. The method according to claim 1, wherein,
   step (b) includes (f) changing the power supply voltage supplied to the semiconductor device through the power supply input unit, (g) storing the power supply voltage, upon the internal circuit detecting the power supply voltage fluctuation generated in the semiconductor device, while being related to the operating frequency of the internal circuit, (h) changing the operating frequency of the internal circuit to another frequency, and (i) repeating step (f), step (g) and step (h).

3. The method according to claim 2, wherein,
step (b) further includes, before step (f), (j) scanning a phase of a clock signal supplying the operating frequency of the internal circuit, and (k) determining the phase of the clock signal where an operating state of the semiconductor device is the worst.

4. The method according to claim 1, wherein,
step (c) further includes (l) changing the mounting manner of the decoupling capacitor, (m) storing the mounting manner, upon the internal circuit detecting the power supply voltage fluctuation generated in the semiconductor device, while being related to the operating frequency of the internal circuit, (n) changing the operating frequency of the internal circuit to another frequency, and (o) repeating step (l), step (m) and step (n).

5. The method according to claim 4, wherein,
step (c) further includes, before the step (l), (q) scanning step of scanning a phase of a clock signal supplying the operating frequency of the internal circuit, and (r) determining the phase of the clock signal where an operating state of the semiconductor device is the worst.

6. The method according to claim 1, further comprising (s) determining the mounting manner of the decoupling capacitor on the semiconductor device so that the semiconductor device can operate based on the fluctuation amount of the power supply voltage.

7. The method according to claim 6, wherein,
step (s) includes (t) judging whether or not the fluctuation amount is within a tolerance level.

8. The method according to claim 7, wherein,
the tolerance level refers to reduction amount of the power supply voltage in the semiconductor device at which the semiconductor device is operable.

9. The method according to claim 1, further comprising
providing a plurality of semiconductor devices, the power supply input unit and a plurality of decoupling capacitors mounted on a printed circuit board, the decoupling capacitor being mounted on the power supply input unit to the semiconductor, evaluating the equivalent fluctuation amount calculated in step (e) at each of the semiconductor devices as evaluation indices of a power supply system of the printed circuit board.

10. A voltage fluctuation amount calculation system for calculating fluctuation amount of power supply voltage in a semiconductor device corresponding to a mounting manner of a decoupling capacitor mounted on a power supply input unit to the semiconductor device, the system comprising:

an internal circuit in the semiconductor device, configured to detect the power supply voltage fluctuation generated in the semiconductor device, the fluctuation of the power supply voltage is detected to indicate a condition under which the internal circuit has stopped operation to indicate that said internal circuit is stuck by the fluctuation of the power supply voltage generated in the semiconductor device;

a storage unit configured to store a first relationship between the power supply voltage supplied to the semiconductor device through the power supply input unit and maximum operable frequency of the internal circuit upon the fluctuation of the power supply voltage being detected by changing the power supply voltage and operating frequency of the internal circuit, and store a second relationship between the maximum operable frequency of the internal circuit and the mounting manner of the decoupling capacitor upon the fluctuation of the power supply voltage being detected by changing the mounting manner of the decoupling capacitor and the operating frequency of the internal circuit; and a controller coupled to the internal circuit in the semiconductor device, configured to:

specify the power supply voltage in the semiconductor device corresponding to the mounting manner of the decoupling capacitor based on the first relationship and the second relationship, and calculate the fluctuation amount from predetermined power supply voltage based on the specified power supply voltage.

11. The system according to 10,
wherein the controller is further configured to:
change the power supply voltage supplied to the semiconductor device through the power supply input unit; and
record the power supply voltage at which the internal circuit detects the power supply voltage fluctuation generated in the semiconductor device, and store the power supply voltage in the storage unit while being related to the operating frequency of the internal circuit.

12. The system according to 10,
wherein the controller is further configured to:
change the mounting manner of the decoupling capacitor; and
record the mounting manner, upon the internal circuit detecting the power supply voltage fluctuation generated in the semiconductor device, and store the mounting manner in the storage unit while being related to the operating frequency of the internal circuit.

13. The system according to 10, wherein,
the internal circuit is a shift register circuit forming a counter circuit having a plurality of register circuits, and the plurality of register circuits are located at an area having the lowest potential when the power supply voltage fluctuates in the semiconductor device.

14. The system according to 10,
wherein the controller is further configured to:
determine the mounting manner of the decoupling capacitor in which the semiconductor device can operate based on the fluctuation amount of the power supply voltage.

* * * * *